(12) United States Patent
Helvik et al.

(10) Patent No.: US 10,747,800 B2
(45) Date of Patent: Aug. 18, 2020

(54) CLUSTERING SEARCH RESULTS IN AN ENTERPRISE SEARCH SYSTEM

(71) Applicant: Microsoft Technology Licensing, LLC, Redmond, WA (US)

(72) Inventors: Torbjørn Helvik, Oslo (NO); Michael James Taylor, Cambridge (GB); Kathrine Hammervold, Oslo (NO); Ainhoa Ostolaza Martin, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/637,875

(22) Filed: Jun. 29, 2017

(65) Prior Publication Data
US 2019/0005051 A1 Jan. 3, 2019

(51) Int. Cl.
| | |
|---|---|
| *G06F 16/00* | (2019.01) |
| *G06F 16/35* | (2019.01) |
| *G06F 16/28* | (2019.01) |
| *G06F 16/904* | (2019.01) |
| *G06F 16/14* | (2019.01) |
| *G06F 16/9535* | (2019.01) |
| *G06F 16/332* | (2019.01) |

(52) U.S. Cl.
CPC .......... *G06F 16/355* (2019.01); *G06F 16/14* (2019.01); *G06F 16/287* (2019.01); *G06F 16/3325* (2019.01); *G06F 16/904* (2019.01); *G06F 16/9535* (2019.01)

(58) Field of Classification Search
CPC .. G06F 16/14; G06F 16/9535; G06F 16/3325; G06F 16/355; G06F 16/287; G06F 16/904; G06F 16/34
USPC ........................................................ 707/725
See application file for complete search history.

(56) References Cited

U.S. PATENT DOCUMENTS

| | | | |
|---|---|---|---|
| 5,991,751 A * | 11/1999 | Rivette ................... | G06F 16/34 707/999.001 |
| 7,062,487 B1 | 6/2006 | Nagaishi et al. | |
| 8,407,229 B2 | 3/2013 | Yang et al. | |
| 9,026,519 B2 | 5/2015 | Parthasarathy et al. | |
| 9,177,050 B2 * | 11/2015 | Lu ........................... | G06Q 10/10 |
| 9,443,008 B2 | 9/2016 | Vadrevu et al. | |
| 9,552,601 B2 | 1/2017 | Ghatare et al. | |
| 2005/0065959 A1 * | 3/2005 | Smith ................... | G06F 16/9537 707/999.102 |
| 2007/0174257 A1 | 7/2007 | Howard | |
| 2009/0094210 A1 | 4/2009 | Reinhardt et al. | |
| 2010/0332520 A1 * | 12/2010 | Lu ........................... | G06Q 10/10 707/769 |
| 2011/0307498 A1 * | 12/2011 | McFarlane ............ | G06F 16/334 707/749 |

(Continued)

OTHER PUBLICATIONS

"International Search Report and Written Opinion Issued in PCT Application No. PCT/US18/034270", dated Jul. 31, 2018, 12 Pages.

(Continued)

*Primary Examiner* — Vincent F Boccio

(57) ABSTRACT

Described herein are enterprise search systems and methods that cluster search results that are associated with the same metadata or the same enterprise search site into one or more clustered results panels of a search results panel. The search results that are not included in the clustered results panel(s) are included in a non-clustered results panel of the search results panel.

21 Claims, 12 Drawing Sheets

(56) References Cited

U.S. PATENT DOCUMENTS

2013/0097143 A1    4/2013   Shenoy et al.
2015/0269231 A1    9/2015   Huynh et al.
2018/0268082 A1*   9/2018   Latzina ................. G06F 16/904

OTHER PUBLICATIONS

Osinski, et al., "A Concept-Driven Algorithm for Clustering Search Results", In Journal of IEEE Intelligent Systems, vol. 20, Issue 3, May 2005, pp. 48-54.

Alonso, et al., "Clustering and Exploring Search Results using Timeline Constructions", In Proceedings of the 18th ACM conference on Information and knowledge management, Nov. 2, 2009, pp. 97-106.

Zeng, et al., "Learning to Cluster web Search Results", In Proceedings of the 27th annual international ACM SIGIR conference on Research and development in information retrieval, Jul. 25, 2004, 8 pages.

* cited by examiner

CLUSTERING SEARCH RESULTS IN AN ENTERPRISE SEARCH SYSTEM

BACKGROUND

An enterprise search system performs searches within an enterprise, such as a business, an organization, an association, or a firm. The enterprise search system indexes data and documents from a variety of sources within the enterprise. Example sources include, but are not limited to, document management systems, intranets, email, instant messages, and databases. Through the enterprise search system, a defined group of search requestors (e.g., employees) is allowed to search for documents and information.

Typically, the search results are presented to the search requestor in a list form that includes a list of ranked results. The ranked results are often ordered based on a determined relevance to the terms in the search query (e.g., the likelihood that the result is what the search requestor is looking for). Different types of documents that are produced by different authors and are obtained from different sources or sites are interleaved in the ranked results. The search requestor must go through the list and examine the titles, the document types, the sources, and if provided, a brief abstract or snippet of each result to determine which results are of interest or relevance to the search requestor. This process of reviewing the ranked search results can be inefficient, time consuming, and frustrating when the ranked results does not include many interesting or relevant results.

SUMMARY

Embodiments disclosed herein provide an enterprise search system that clusters multiple search results that are associated with the same metadata into one or more clustered results panels of a search results panel. The search results that are not included in the clustered results panel(s) are included in a non-clustered results panel of the search results panel. In one embodiment, a subset of ranked search results are considered or reviewed when determining whether multiple results are associated with the same metadata. For example, the subset can be the top N results of the ranked search results, where N is a number that is greater than one.

In one aspect, an enterprise search system includes a processing unit and a storage device that stores computer executable instructions that when executed by the processing unit, performs a method. The method includes identifying a result metadata type that is associated with a subset of ranked search results, identifying a result metadata corresponding to the result metadata type that is associated with one or more results in the subset of ranked search results, and determining a score associated with the result metadata. The score is then compared to a threshold value and based on the comparison, the one or more results associated with the result metadata are grouped in a cluster and the cluster is included in a clustered results panel of a search panel. The ranked search results not included in the subset are included in a non-clustered results panel of the search panel.

In another aspect, a method of operating an enterprise search system includes identifying a result metadata that is associated with a subset of ranked search results, determining a score associated with the result metadata, and comparing the score to a threshold value. Based on the comparison, the results in the subset of ranked search results are grouped into a cluster and the cluster is included in a clustered search results panel when the score is a first value, or the subset of ranked search results is included in the non-clustered results panel of the search results panel when the score is a second value. The ranked search results not included in the subset are included in a non-clustered results panel of the search panel.

In yet another aspect, a method includes identifying a result metadata type that is associated with a subset of ranked search results, and determining a score associated a result metadata corresponding to the result metadata type. The result metadata type comprises a hierarchy of enterprise storage sites and the result metadata comprises a particular enterprise storage site in the hierarchy of enterprise storage sites. The score is compared to a threshold value. Based on the comparison, the results in the subset of ranked search results are grouped into a cluster and the cluster is included in a clustered search results panel when the score is a first value, or the subset of ranked search results is included in the non-clustered results panel of the search results panel when the score is a second value. The ranked search results not included in the subset are included in a non-clustered results panel of the search panel.

In another aspect, a method includes identifying a first result metadata type that is associated with a subset of ranked search results, and identifying a second result metadata type that is associated with one or more results in the subset of ranked search results. A score associated with the first result metadata and the second result metadata is determined. Based on the comparison, the one or more results are grouped into a cluster and the cluster is included in a clustered search results panel when the score is a first value, or the subset of ranked search results is included in the non-clustered results panel of the search results panel when the score is a second value. The ranked search results not included in the subset are included in a non-clustered results panel of the search panel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
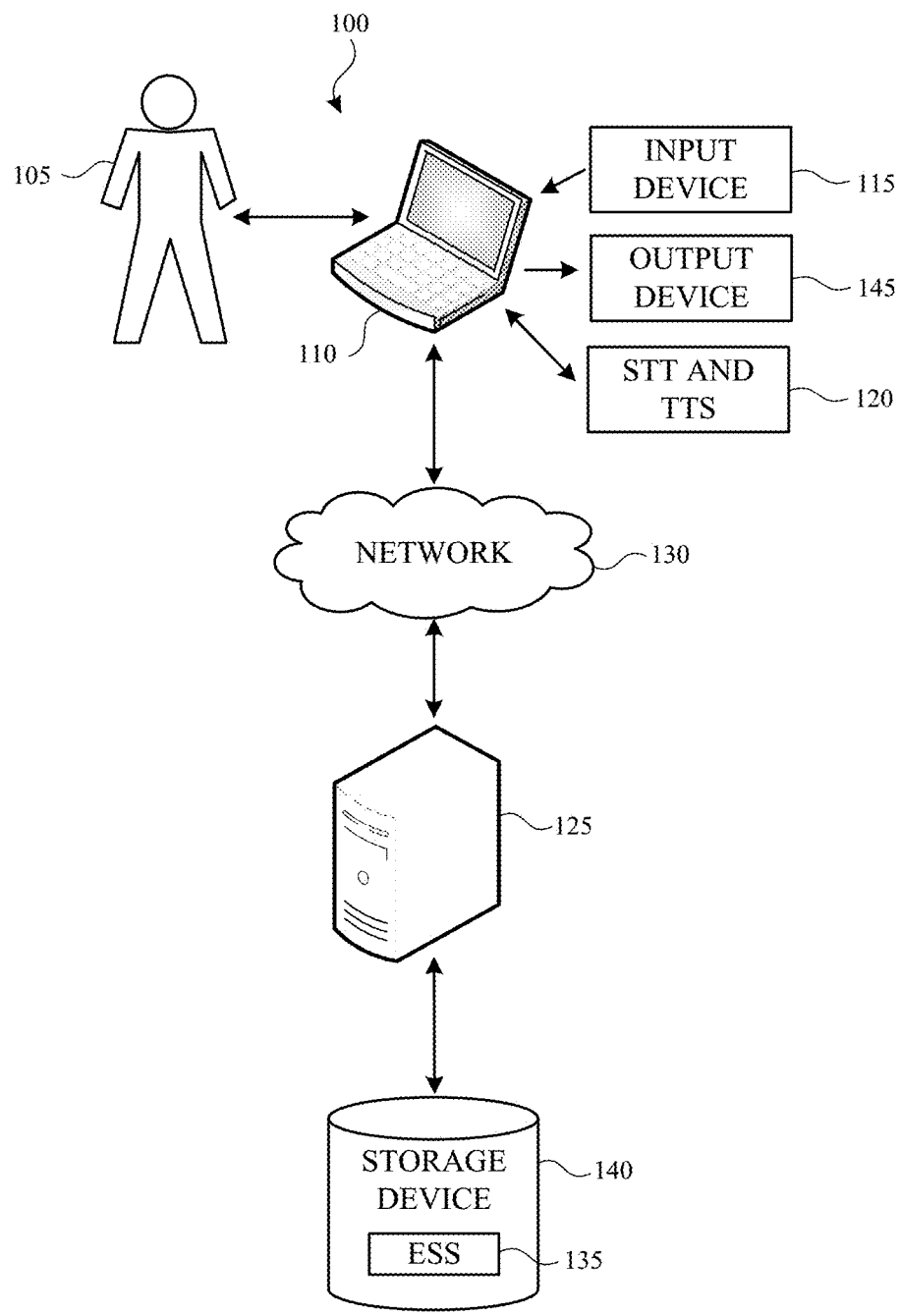
FIG. 1 illustrates an example system that can include an enterprise search system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide an enterprise search system that clusters, groups, and/or arranges at least a subset of search results by one or more types of data (hereinafter "result metadata"). Example result metadata includes, but is not limited to, indications of (or identifiers associated with) a person (e.g., an author), a storage site associated with the enterprise ("an enterprise storage site"), a document type (e.g., word processing or presentation document), a job title associated with a person (e.g., CEO, VP of Marketing), a title, one or more keywords, a creation and/or a revision date, a time period, and/or a project. The clustered results are included in a clustered results panel in a search results panel. The results that are not clustered are included in a non-clustered results panel in the search results panel.

In some instances, additional metadata is included in the clustered results panel. The additional metadata provides additional information to a search requestor regarding the cluster and/or one or more results in the cluster. The additional metadata is metadata that is retrieved from or compiled based on the result metadata and/or from other sources (e.g., from a contacts file, a team membership, etc.). The additional metadata can be any suitable type of metadata. In one embodiment, the additional metadata includes personalized metadata, enterprise metadata, interaction metadata, and/or organization metadata. Personalized metadata can provide contact and/or personal information related to a person or a group. Enterprise metadata may provide information related to an enterprise storage site. Interaction metadata can list other interactions the search requestor has had with a person, a group, a project, and the like. Organization metadata may provide information that is associated with the search requestor, such as, for example, a present and/or prior organizational relationship to person (e.g., a co-worker, a boss, a team leader) and/or a project.

The disclosed embodiments provide a search results panel that can indicate to the search requestor the relationship between the clustered results, which can assist a search requestor in determining whether the results are relevant to his or her search. When the enterprise system includes a hierarchy of enterprise storage sites, clustering the results by a particular enterprise storage site allows the search requestor to locate, explore, and/or perform an action on the enterprise storage site. For example, the enterprise storage site may store other documents and data that did not receive a rank value that situated the documents and data in a higher position within the ranked search results but the search requestor may still want to review them. Clustering the search results by the enterprise storage site can make it easier for the search requestor to discover these other documents and data. Additionally or alternatively, the clustered results panel or panels improve the information discovery process because the results in a cluster are associated with the same metadata. In some embodiments, the clustered and non-clustered results panels increase the diversity of the search results because the search results are not flooded with similar results from a limited number of storage sites.

FIG. 1 illustrates an example system that can include an enterprise search system. The system 100 allows a search requestor 105 to submit one or more search requests through a client-computing device 110. Although the search requestor 105 is represented as a person, in other embodiments the search requestor can be an application running on the client-computing device 110. The client-computing device 110 may include, or be connected to, an input device 115 that receives a search request. The search request can be submitted as a textual request (e.g., written) or as a spoken request (verbal) that is converted to text (e.g., using a speech-to-text (STT) apparatus 120). The input device 115 may be any suitable type of input device or devices configured to receive the search request. In non-limiting examples, the input device 115 may be a keyboard (actual or virtual) and/or a microphone.

The client-computing device 110 is configured to access one or more server-computing devices (represented by server-computing device 125) through one or more networks (represented by network 130). The network 130 is illustrative of an enterprise-based network, for example, an intranet, and/or a distributed computing network, for example, the Internet, over which the search requestor 105 may communicate with other users and with other computing systems in an enterprise.

An enterprise search system (ESS) 135 is stored on one or more storage devices (represented by storage device 140). The operations of the ESS 135 are performed by one or more computing devices, such as, for example, the server-computing device 125. The one or more computing devices each include at least one memory that stores computer or processing unit executable instructions that, when executed by at least one processing unit in the computing device(s), perform the operations of the ESS 135.

As will be described in more detail later, the ESS 135 receives a search request, performs a search operation, and causes the search results to be provided or transmitted to the client-computing device 110. The search results can be provided to the search requestor 105 through one or more output devices (represented by output device 145) that is in, or connected to, the client-computing device 110. In non-limiting examples, the output device 145 is a display that displays the search results in a search results panel and/or a speaker that "speaks" the search results in the search results panel (e.g., using a text-to-speech (TTS) apparatus 120).

In one or more embodiments, the client-computing device 110 is a personal or handheld computing device having both the input device 115, the output device 145, and the STT and TTS apparatuses 120. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with an ESS may be utilized.

As should be appreciated, FIG. 1 is described for purposes of illustrating the present methods and systems and is not intended to limit the disclosure to a particular sequence of steps or a particular combination of hardware or software components.

Figure 2:
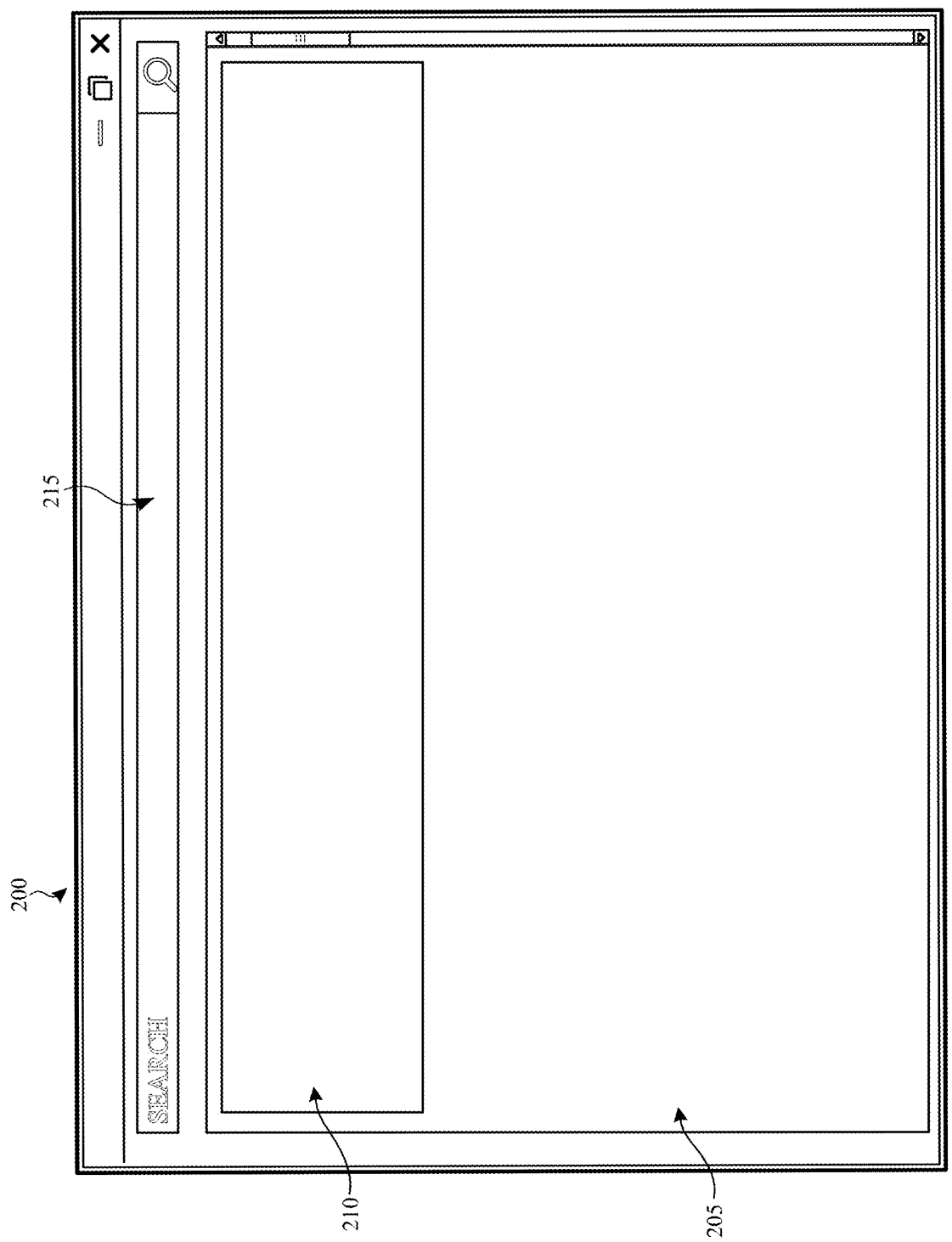
FIG. 2 is a block diagram depicting an example search results panel.

FIG. 2 is a block diagram depicting an example search results panel. The search results panel 200 includes one or more non-clustered results panels (represented by non-clustered results panel 205) and one or more clustered results panels (represented by clustered results panel 210). In the illustrated embodiment, the clustered results panel 210 is disposed within the non-clustered result panel 205, although this is not required. Each clustered and non-clustered results panel 205, 210 can be situated at any suitable position in the search results panel 200. For example, the clustered results panel 210 may be located above and outside of the non-clustered results panel 205. Alternatively, the clustered results panel 210 may be positioned along one or more side edges of the search results panel 200.

The non-clustered results panel(s) 205 can include or display ranked search results that are not included in a clustered results panel 210. Each clustered results panel 210 can contain or display one or more clusters. As will be described in more detail later, the search results in a clustered results panel 210 can be clustered, grouped, and/or arranged by one or more types of metadata. As described earlier, example metadata includes, but is not limited to, indications of a person (e.g., an author), an enterprise storage site, a document type (e.g., word processing or presentation document), a job title associated with a person (e.g., CEO, VP of Marketing), a title, one or more keywords, a creation and/or a revision date, a time period, and/or a project.

In some embodiments, the search results panel 200 may include a search query input field 215. Additionally or alternatively, the search query received from a search requestor (e.g., a person or an application) and searched by the ESS may be listed in the search results panel 200.

In other embodiments, the search results panel 200 can include the non-clustered results panel 205 and any number of clustered results panels 210, where the number can equal or exceed zero.

Figure 3:
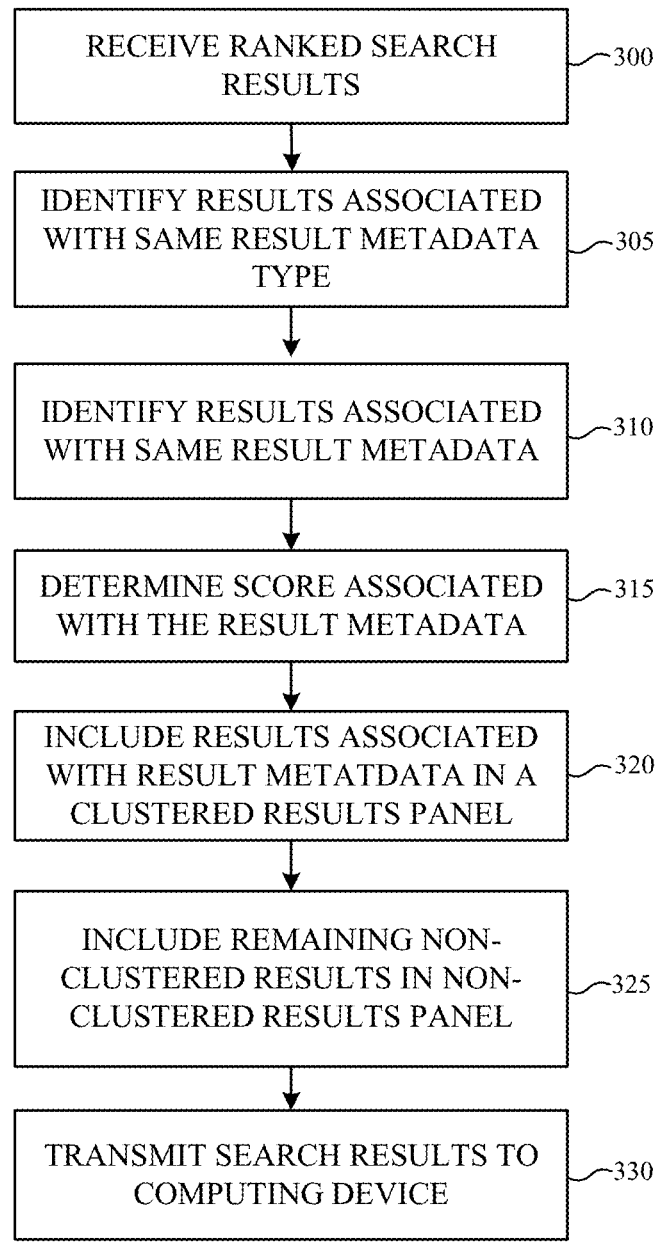
FIG. 3 is a flowchart illustrating an example first method of performing a search operation that clusters search results according to metadata.

FIG. 3 is a flowchart illustrating an example first method of performing a search operation that clusters search results according to metadata. Initially, ranked search results are received in block 300. The search results are produced in response to a search query that was received from a computing device (e.g., client-computing device 110 in FIG. 1). In aspects, results in the ranked search results that are associated with a result metadata type are identified at block 305. The result metadata type can be any suitable metadata that acts as a classification identifier for a type of metadata. For example, a result metadata type may be "person", "enterprise storage site", "document type", "job title", "title", "keywords", "date", "time period", and/or "project". In one embodiment, the results considered in block 305 comprise a given number of results (e.g., a subset of the search results). For example, the given number of results can be the top N results, where N is an integer that is greater than one.

Next, as shown in block 310, one or more results that are included in the results identified at block 305 and that are associated with a result metadata are identified. The result metadata corresponds to the result metadata type. For example, a result metadata type may be "person" and a result metadata can be a name of a person (e.g., name of an author of at least one result). In some instances, a result metadata type may be "enterprise storage sites" and a result metadata can be an identifier for a particular enterprise storage site.

Thereafter, a score that is associated with the result metadata is determined (block 315). In one embodiment, a score is computed for each result that is associated with the result metadata. The results associated with a score that equals or exceeds a threshold value, a score that falls within a range of scores, or a score that differs from the score of an immediately preceding or succeeding result by a given amount are included in a clustered results panel (block 320). Thus, the threshold value can be a particular value, a range of scores, or a particular delta or difference amount, and each score may be compared to the threshold value to determine if the result is to be included in the clustered results panel. Based on the comparison, the results are included in a clustered results panel of the search results panel when the score is a first value, and the results are included in the non-clustered results panel of the search results panel when the score is a second value. For example, when the threshold value is a particular value, the results are included in the clustered results panel when the score equals or exceeds the threshold value (the first value). Alternatively, the results are included in the non-clustered results panel when the score is less than the threshold value (the second value).

Any remaining results (e.g., results not associated with the result metadata) are included in the non-clustered results panel (block 325). In one embodiment, the remaining results are presented as ranked search results in the non-clustered results panel. The search results are then transmitted to a computing device, such as a client-computing device, at block 330.

In some embodiments, one or more result metadatas can correspond to one result metadata type. Thus, the operation of block 305 repeats for each result metadata type, and for each result metadata type, the operations of blocks 310, 315, 320, and 325 repeat until all of the result metadatas associated with the result metadata types are processed. Once all of the result metadata types and the result metadatas are processed, the operation of block 330 is performed. In such embodiments, the search results panel includes the non-clustered results panel and any number of clustered results panels, where the number can equal or exceed zero.

Figure 4:
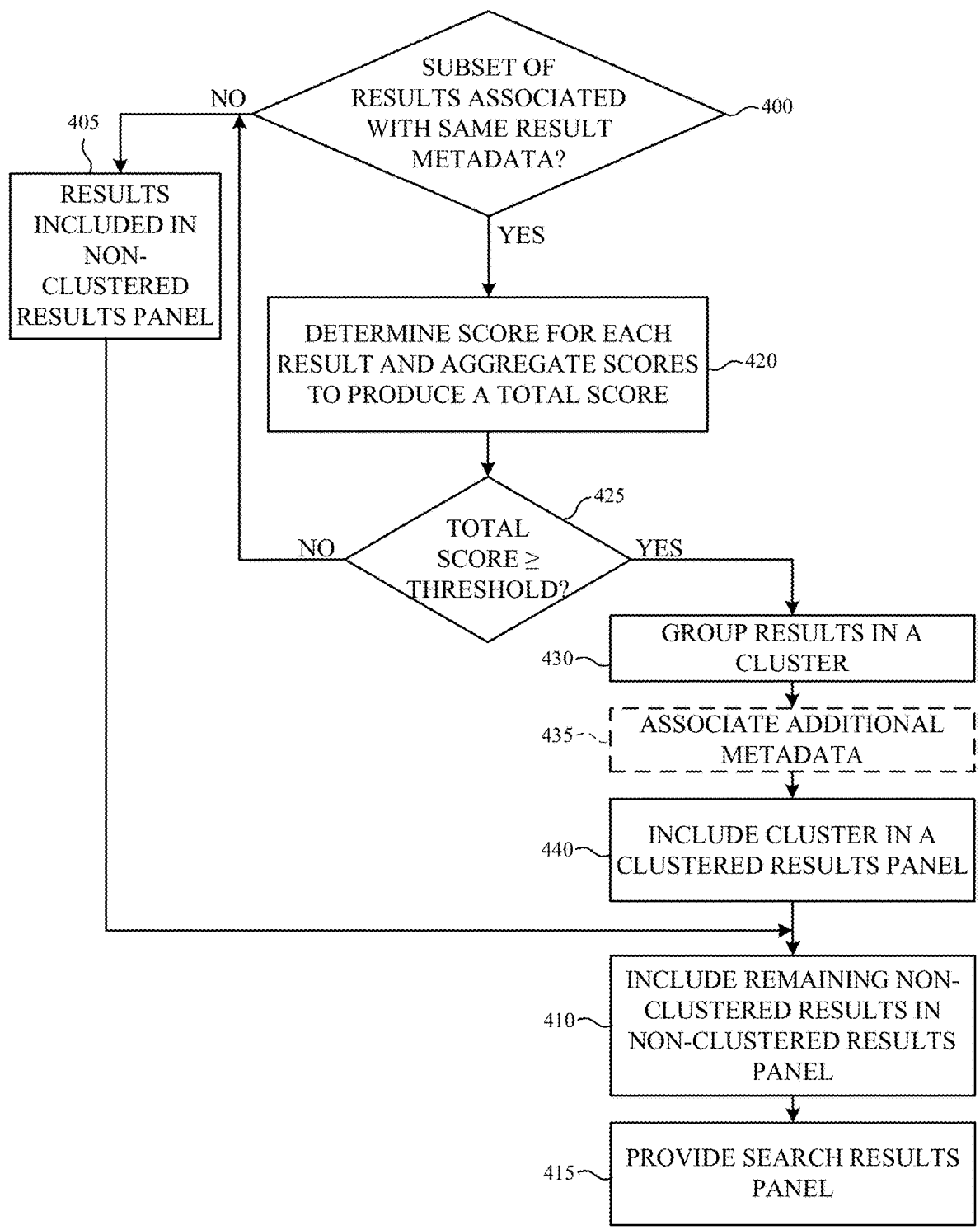
FIG. 4 is a flowchart depicting an example second method of performing a search operation that clusters search results according to metadata.

FIG. 4 is a flowchart depicting an example second method of performing a search operation that clusters search results according to metadata. Although not shown in FIG. 4, in some embodiments, blocks 300 and 305 in FIG. 3 are performed prior to block 400 in FIG. 4. After ranked search results are received, a determination is made at block 400 as to whether a subset of ranked search results is associated with the same result metadata. In one embodiment, the subset of the ranked search results can be included in the top N results, where N is an integer that is greater than one. In a non-limiting example, the determination at block 400 may comprise determining if the subset of ranked search results is associated with a name of a person and/or with an identifier for a particular enterprise storage site.

If the determination made at block 400 is that a subset of ranked search results is not associated with the result metadata, the process passes to block 405 where the ranked search results are included in a non-clustered results panel of a search results panel. Thereafter, the remaining results are included in the non-clustered result panel at block 410. For example, the results not included in the subset are included in the non-clustered results panel.

The search results panel is then provided to the search requestor (block 415). Any suitable technique can be used to provide the search results panel to the search requestor. For example, in one embodiment, the search results are transmitted to a client-computing device, which causes the search results to be displayed in a search results panel on a display that is in, or connected to, the client-computing device (e.g., client-computing device 110 in FIG. 1).

Returning to block 400, if a subset of the ranked search results is associated with a same result metadata, the method continues at block 420 where a score associated with the result metadata is determined. In one embodiment, a score is determined for each result associated with the same result metadata (e.g., person) and the scores aggregated to produce a total score that is associated with the result metadata. For example, when multiple results are associated with the name of a person, a score is computed for each result and the scores summed or aggregated to produce a total score that is associated with the name of the person.

In one embodiment, the score for each result is determined by multiplying the rank value of a result that is based on the position of the result in the ranked search results by a respective weighting factor. Any suitable weighting factor can be used. For example, in one embodiment, the weighting factor is determined by the equation $w_i=M/(M+i)$, where M is a real number and i represents the rank or position of the result in the ranked search results. For example, for the top-ranked result the weighting factor is one ($w_0=M/(M+0)$). The number M is selected based on how quickly or slowly the weighting factor $w_i$ is to approach zero. A larger number for M will cause the weighting factor $w_i$ to approach zero more slowly while a smaller number will cause the weighting factor $w_i$ to approach zero more quickly. The rate at which the weighting factor $w_i$ approaches zero can affect the number of results included in a cluster and/or the number of clusters that are produced.

In some embodiments, the number M is pre-determined and fixed in an ESS. Thus, the number M is the same for each search. In other embodiments, the number M is selectable by a search requestor and/or another person. For example, a search requestor, an administrator, a team leader, and/or an IT professional may select the number M for each search to be performed or for select searches based on any suitable criterion. Example criterion or criteria include, but are not limited to, the term or terms in the search query, the requirements or preferences of the enterprise, and/or the requirements or performance level of the ESS.

Returning to block 420, the process passes to block 425 when the total score is determined. At block 425, a determination is made as to whether the total score equals or exceeds a threshold value. Any suitable value can be used for the threshold value. In some instances, a higher threshold value can reduce the number of scores that equal or exceed the threshold value, which in turn reduces the number of results in a cluster and/or the number of clusters. Similarly, a lower threshold value can increase the number of scores that equal or exceed the threshold value, which in turn increases the number of results in a cluster and/or the number of clusters. Like the number M in the weighting factor equation, the threshold value is pre-determined and fixed in some embodiments. In other embodiments, the threshold value is selectable by a search requestor or other person (e.g., an IT professional).

If the total score does not equal or exceed the threshold value, the method continues at block 405 where the results associated with the total score are included in a non-clustered results panel and the operations of blocks 410 and 415 are performed. When the determination is that the total score equals or exceeds the threshold value, the method passes to block 430 where the results associated with the total score are grouped into a cluster. Additional metadata can then be associated with the cluster to provide additional information regarding the cluster and/or one or more results in the cluster (block 435). The additional metadata can be any suitable metadata. For example, the additional metadata may be a project name, metadata that provides contact and/or personal information related to a person or a group, and/or metadata associated with the user (e.g., present and/or prior relationship to person, project, and the like). Block 435 is optional (represented by dashed lines) and may be omitted in other embodiments.

Next, as shown in block 440, the cluster is provided or included in a clustered results panel. The process then continues at block 410.

The process is described in conjunction with one result metadata. In other embodiments, the method can be performed multiple times on the same ranked search results using different result metadata types and/or different result metadatas. In such embodiments, the operations in blocks 400, 405, 420, 425, 430, 435, and 440 repeat until all of the result metadata types and/or result metadatas are processed. The operations in blocks 410 and 415 are performed after all of the result metadata types and/or result metadatas are processed.

An example embodiment is now described to illustrate the operations of determining a total score for a result metadata and comparing the total score to a threshold value. In this example, the result metadata type is "person" and there are multiple result metadatas that comprise the names of persons who authored or edited one or more results in the search results. Table 1 depicts a list of a subset of ranked search results (N results) from a ranked search result, where N equals twenty-one. Table 1 also lists the score associated with each result metadata (e.g., the name of the author). In this illustrated embodiment, the score is based on the rank value of the result based on the position of the result in the ranked search results multiplied by a respective weighting factor.

TABLE 1

| RANK | SCORE | AUTHOR (METADATA) |
| --- | --- | --- |
| 0 | 1.00 | Bob |
| 1 | 0.83 | Alice |
| 2 | 0.71 | Alice |
| 3 | 0.63 | Greg |
| 4 | 0.56 | Bruce |
| 5 | 0.50 | Susanne |
| 6 | 0.45 | Susanne |
| 7 | 0.42 | Bob |
| 8 | 0.38 | Susanne |
| 9 | 0.36 | Alice |
| 10 | 0.33 | Bob |
| 11 | 0.31 | Nitin |
| 12 | 0.29 | Ola |
| 13 | 0.28 | Ola |

TABLE 1-continued

| RANK | SCORE | AUTHOR (METADATA) |
|---|---|---|
| 14 | 0.26 | Ibrahim |
| 15 | 0.25 | Susanne |
| 16 | 0.24 | Susanne |
| 17 | 0.23 | Alice |
| 18 | 0.22 | Susanne |
| 19 | 0.21 | Ibrahim |
| 20 | 0.22 | Nitin |

As shown, one or more results are associated with each author (e.g., with a same result metadata). In particular, six results are associated with the result metadata "Susanne" (results 5, 6, 8, 15, 16, 18), four results are associated with the result metadata "Alice" (results 1, 2, 9, 17), three results are associated with the result metadata "Bob" (results 0, 7, 10), and two results are associated with the result metadata "Nitin" (results 11, 20), "Ola" (results 12, 13), and "Ibrahim" (results 14, 19).

The score(s) for each result that is associated with the same result metadata are aggregated or summed to produce a total score for the different result metadatas. Table 2 depicts the total score for each of the different result metadatas.

TABLE 2

| METADATA | TOTAL SCORE |
|---|---|
| Alice | 2.13 |
| Susanne | 2.04 |
| Bob | 1.75 |
| Greg | 0.63 |
| Ola | 0.57 |
| Bruce | 0.56 |
| Nitin | 0.53 |
| Ibrahim | 0.47 |

Each total score is then compared to a threshold value to determine if the total score equals or exceeds the threshold value (block 420 in FIG. 4). For example, if the threshold value is 2, the total scores for Alice and Susanne equal or exceed the value 2. Thus, the results associated with Alice are grouped into a cluster and the results associated with Susanne are grouped into another cluster. The clusters are included in a clustered results panel. The clusters can be included in one clustered results panel (see, e.g., FIG. 5A) or each cluster may be included in a separate cluster panel. The results associated with the remaining result metadatas (authors) are not grouped into a cluster and are included in a non-clustered results panel.

The number of clusters that are created can be affected by the threshold value. In this example embodiment, only two clusters are formed when the threshold value is 2. If, however, the threshold value is 1, three clusters are created. Similarly, if the threshold value is 2.5, no clusters are formed and all of the results are included in a non-clustered results panel.

Although the threshold value is described as a number that is compared to each total score to determine if the total score equals or exceeds the threshold value, other embodiments are not limited to this type of threshold value. As described earlier, in one embodiment the threshold value may be a range of total scores that each total score is compared with to determine if the total score is within the range. In another embodiment, the threshold value may be a particular delta or difference amount, and each total score is compared to the threshold value to determine if the total score differs from the total score of an immediately preceding or succeeding metadata (e.g., the adjacent author) by the threshold value.

Figure 5A:
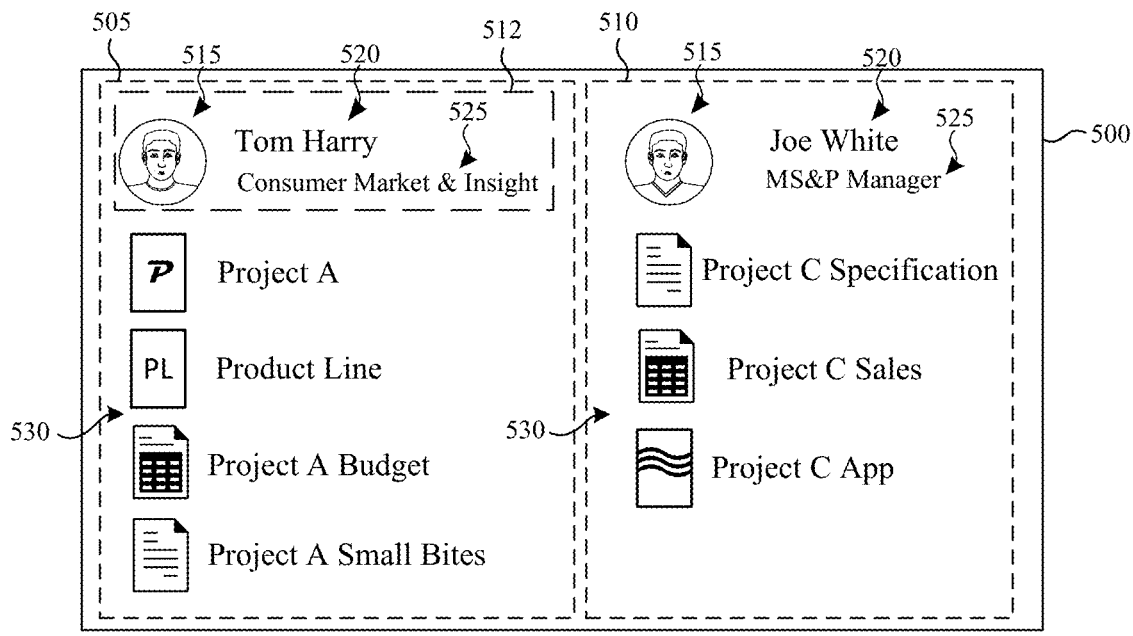
FIGS. 5A-5B illustrate example clustered results panels that may be produced by the method shown in FIG. 4.
Figure 5B:
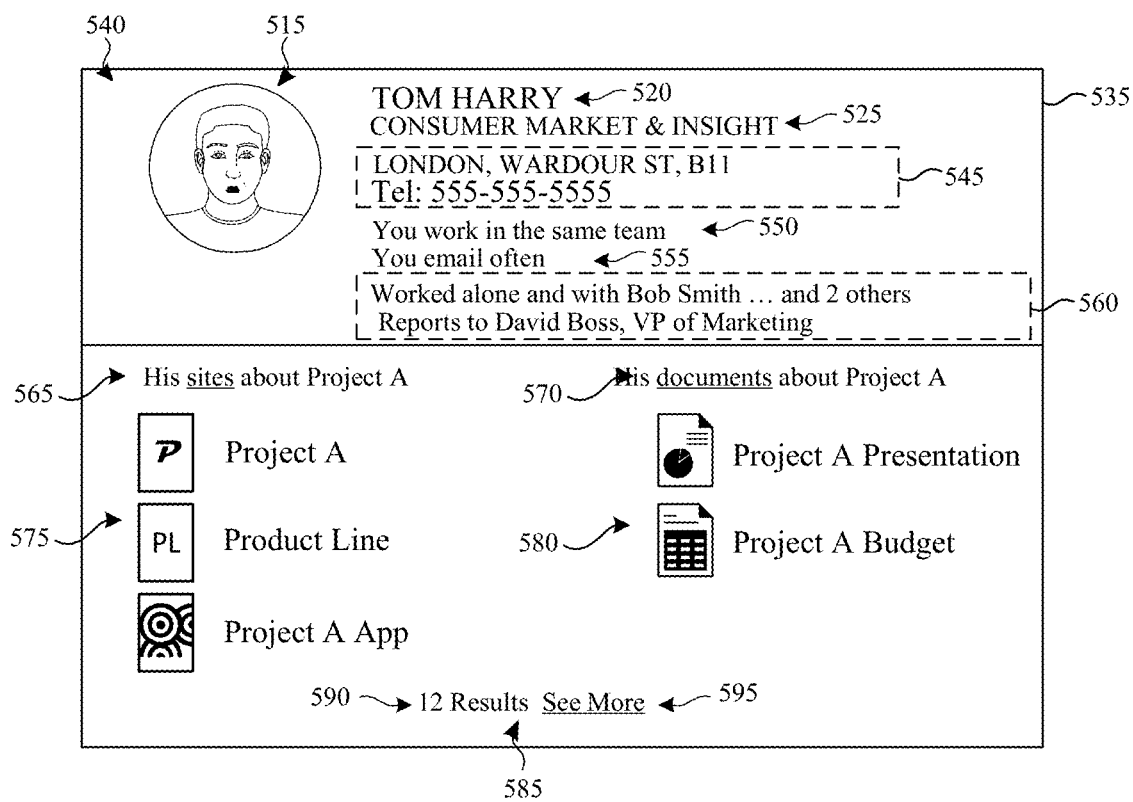

FIGS. 5A-5B depict example clustered results panels that may be produced by the method shown in FIG. 4. FIG. 5A illustrates a single clustered results panel 500 that includes two clusters 505, 510. The first cluster 505 and the second cluster 510 each includes additional metadata. As described earlier, the additional metadata provides additional information to a search requestor regarding the cluster and/or one or more results in the cluster. The additional metadata is metadata that is retrieved from or compiled based on the result metadata and/or from other sources (e.g., from a contacts file, a team membership, etc.). The additional metadata can be any suitable type of metadata. In one embodiment, the additional metadata includes personalized metadata, interaction metadata, and/or organization metadata.

Each cluster 505, 510 includes personalized metadata 512 that is associated with the respective result metadata (the name of a person). In the illustrated embodiment, the personalized metadata 512 includes three types of metadata: a photo or graphic representation 515 of the person, a name 520 of the person, and a job role or title 525.

The first and the second clusters 505, 510 further include a set of results 530 that are associated with the result metadata (the name of the person). In the illustrated embodiment, each set of results 530 includes multiple results, which may include any suitable type of result. Example types of results include, but are not limited to, documents, applications, communications (e.g., email, instant message, etc.), photos, videos, audio, links, web sites, enterprise storage sites, and the like.

FIG. 5B depicts a single clustered results panel 535 that includes one cluster 540. The clustered results panel 535 includes additional metadata that is associated with the cluster 540. The additional metadata includes personalized metadata (e.g., same personalized metadata 512 as shown in FIG. 5A along with contact information 545), relationship metadata 550, interaction metadata 555, and organization metadata 560. The contact information 545 provides contact information for the person. Any suitable contact information can be used, such as a mailing and/or a physical address, an email address, and/or telephone number. The contact information 545 illustrated in FIG. 5B includes a physical address and a telephone number.

The relationship metadata 550 can include any suitable relationship information associated with the result metadata (the name of the person) and/or of interest to the search requestor. In the illustrated embodiment, the relationship metadata 550 includes one work relationship ("You work on the same team"). The interaction metadata 555 provides information on various interactions between the search requestor and the result metadata (the name of the person) and/or interactions between the result metadata and other individuals, web sites, and/or enterprise storage sites. In FIG. 5B, the interaction metadata 555 indicates the search requestor emails the result metadata often ("You email often"). Finally, the organization metadata 560 lists information on organizational relationships associated with the result metadata. In the illustrated embodiment, the organization metadata 560 indicates the relationship the result metadata has with David Boss ("Reports to David Boss, VP of Marketing") and the current and/or previous work situations or experiences associated with the result metadata ("Worked alone and with Bob Smith . . . and 2 others").

Additional or different relationship, personalized, and/or organization metadata can be provided in the clustered results panel 535 in other embodiments. For example, the relationship metadata can list previous project names and/or the names of people the person and the search requestor know or have in common. The organization metadata can include a graphic depicting an organization chart for the team or a list of the team members on a team. Likewise, the interaction metadata may include other types of interactions, such as social media interactions (e.g., "You follow Tom"), texts, emails, phone calls, meetings, and/or a list of the last X interactions, where X is a number.

As described earlier, a clustered results panel may include one or more result metadata types and/or result metadatas. The clustered results panel 535 shown in FIG. 5B is based on four different result metadata types; "person", "project", "document type" and "enterprise storage site." Thus, the clustered results may be divided into a first category 565 and a second category 570. The first category 565 includes the results associated with the result metadata (e.g., Project A) associated with the result metadata type "project" that are stored in various result metadatas (e.g., Project A, Product Line, and Project A App) associated with the result metadata type "enterprise storage sites", while the second category 570 includes the results associated with the result metadata type "project" (Project A) and the result metadata type "document type" (e.g., presentation and spreadsheet document types). The first category 565 lists a first set of results 575 and the second category 570 lists a second set of results 580.

The representative clustered results panel 535 further includes additional information 585. The additional information 585 can be the number of results 590 that are found in the search and/or a link 595 to see more results (link indicated by underlining). In some embodiments, the word "sites" in the first category 565 and/or the word "files" in the second category 570 can function as a link to additional sites and/or files (links indicated by underlining).

Figure 6:
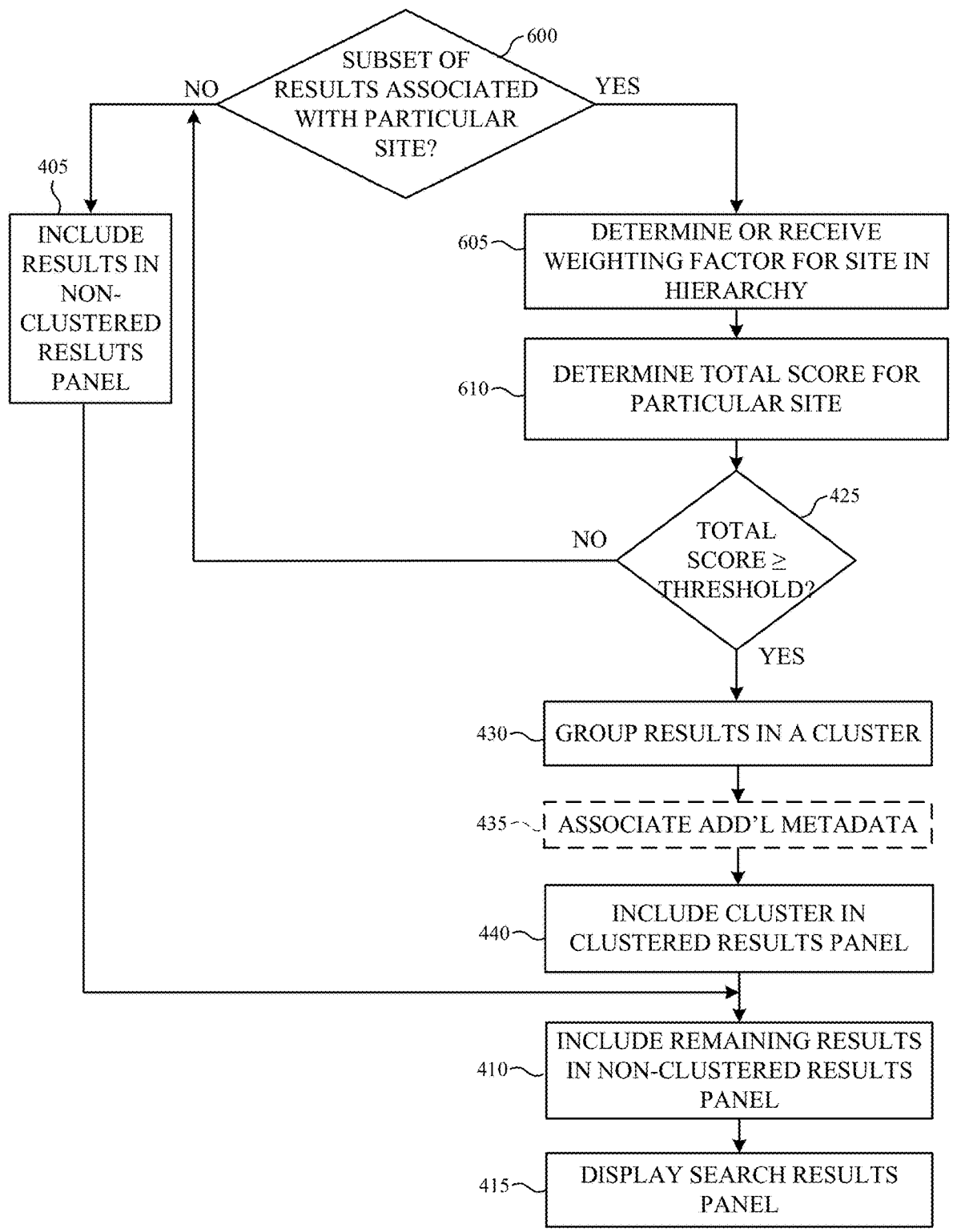
FIG. 6 is a flowchart depicting an example third method of performing a search operation that clusters search results according to enterprise storage sites.

FIG. 6 is a flowchart illustrating an example third method of performing a search operation that clusters search results according to enterprise storage sites. As described earlier, the enterprise storage sites can be a type of metadata in which an ESS clusters results. Many of the operations in FIG. 6 correspond to operations shown in FIG. 4. Accordingly, these operations include the same reference number used in FIG. 4 and are not discussed in detail in conjunction with FIG. 6. Additionally, in some embodiments, blocks 300 and 305 in FIG. 3 are performed prior to block 600 in FIG. 6.

Initially, a determination is made as to whether a subset of the ranked search results is associated with a same result metadata (block 600). In the illustrated embodiment, the result metadata is an identifier for an enterprise storage site. In one embodiment, the subset of the ranked search results can be the top N results, where N is an integer that is greater than one. In a non-limiting example, the enterprise storage sites in the ESS are configured in a hierarchy, such as Top Level Site>First Level Site>Second Level Site>Result. In such embodiments, the determination at block 600 determines whether the subset of the ranked search results is stored in a particular enterprise site in the hierarchy.

If a subset of the ranked search results is not stored in a same enterprise storage site, the process passes to block 405 where the ranked search results are provided in a non-clustered results panel in a search results panel. If a subset of the ranked search results is stored in a same enterprise storage site, the method continues at block 605 where a score is determined or received for each enterprise site. In one embodiment, the score is based on the level or rank of the enterprise storage site within the hierarchy, and the score can be pre-assigned in one embodiment. In other embodiments, the score is selectable by a search requestor and/or another person. For example, a search requestor, an administrator, and/or an IT professional may select the scores for each search or for select searches based on any suitable criterion. Example criterion or criteria include, but are not limited to, the search query, the requirements or preferences of the enterprise, and/or the requirements or performance level of the ESS.

Next, as shown in block 610, a score is associated with the result metadata (e.g., the identifier for an enterprise storage site). In one embodiment, the score is a total score that is determined by summing a rank value of each result that is based on the position of the result in the ranked search results and multiplying the sum by a particular weighting factor. The weighting factor can be based on the rank of the enterprise storage site within the hierarchy of enterprise storage sites. Table 3 depicts example weighting factors for the different enterprise storage site levels.

TABLE 3

| ENTERPRISE STORAGE SITE | SITE WEIGHTING FACTOR |
| --- | --- |
| Top Level Site | 0.3 |
| First Level Site | 0.6 |
| Second Level Site | 1 |

The illustrated weighting factors give the lower-level sites more weight than the Top Level Site. Other embodiments can use different weighting factors. Additionally, the weighting factors can weigh the different levels in any given pattern.

In another embodiment, the total score may be determined based on the following equation:

$$\text{Total score} = (\text{site weighting factor}) * \Sigma(\text{result rank value} * \text{site rank value}),$$

where the result rank is the rank value of a result based on the position of the result in the ranked search results, the site rank is the rank value of an enterprise storage site based on the position of the enterprise storage site in the hierarchy of enterprise storage sites, and the site weighting factor is the weighting factor associated with the enterprise storage site.

Returning to FIG. 6, once the total score is determined at block 610, the method continues at block 425 where the total score is compared to a threshold value to determine if the total score equals or exceeds the threshold value. If not, the process passes to block 405 where the subset of the ranked search results is included in a non-clustered results panel and the operations of blocks 410 and 415 are performed. When the total score equals or exceeds the threshold value, the method passes to block 430 where the subset of the ranked search results are included in a cluster. Additional metadata can then be associated with the cluster and/or for one or more results in the cluster (block 435). Block 435 is optional (represented by dashed lines) and may be omitted in other embodiments.

Next, as shown in block 440, the cluster is provided or included in a clustered results panel. The process then continues at block 410, where the remaining results are included in the non-clustered results panel and the operation of block 415 is performed.

Although the threshold value in block 425 is described as a number that is compared to each total score to determine if the total score equals or exceeds the threshold value, other embodiments are not limited to this type of threshold value. As described earlier, in one embodiment the threshold value may be a range of total scores that each total score is compared with to determine if the total score is within the range. In another embodiment, the threshold value may be a particular delta or difference amount, and each total score is compared to the threshold value to determine if the total score differs from the total score of an immediately preceding or succeeding metadata by the threshold value.

Additionally, like the embodiment depicted in FIG. 4, the method is described in conjunction with one result metadata. In other embodiments, the method can be performed multiple times on the same ranked search results using different result metadata types and/or different result metadatas. In such embodiments, the operations in blocks 600, 405, 605, 610, 425, 430, 435, and 440 repeat until all of the result metadata types and/or result metadatas are processed. The operations in blocks 410 and 415 are performed after all of the result metadata types and/or result metadatas are processed.

Figure 7A:
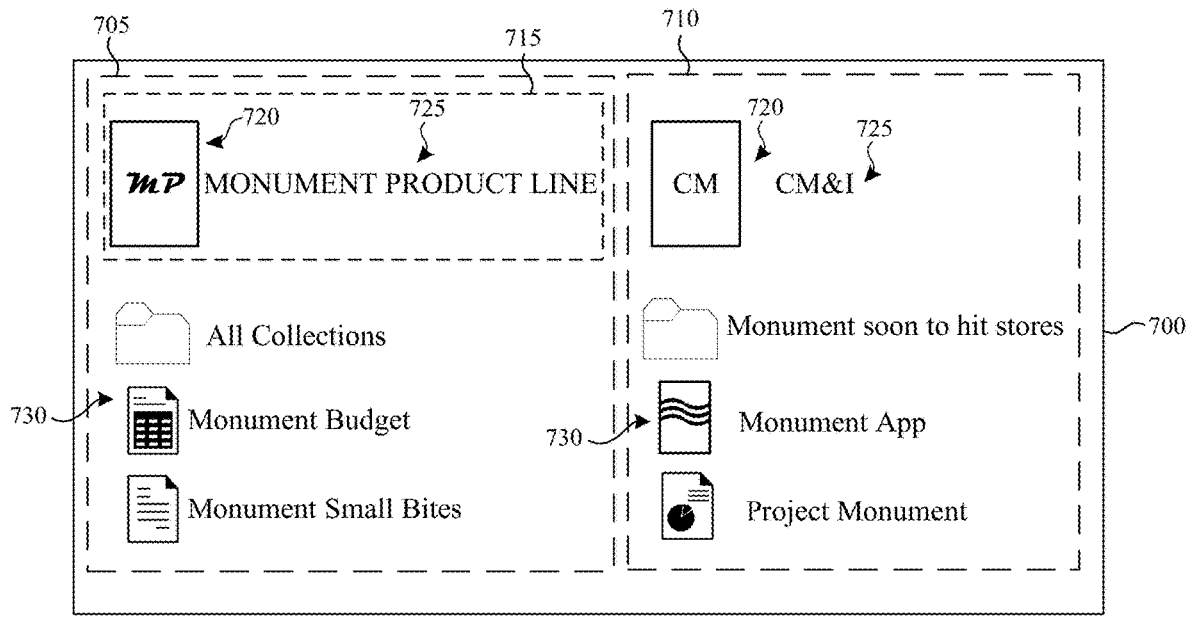
FIGS. 7A-7B illustrate example clustered results panels that can be produced by the method shown in FIG. 6.
Figure 7B:
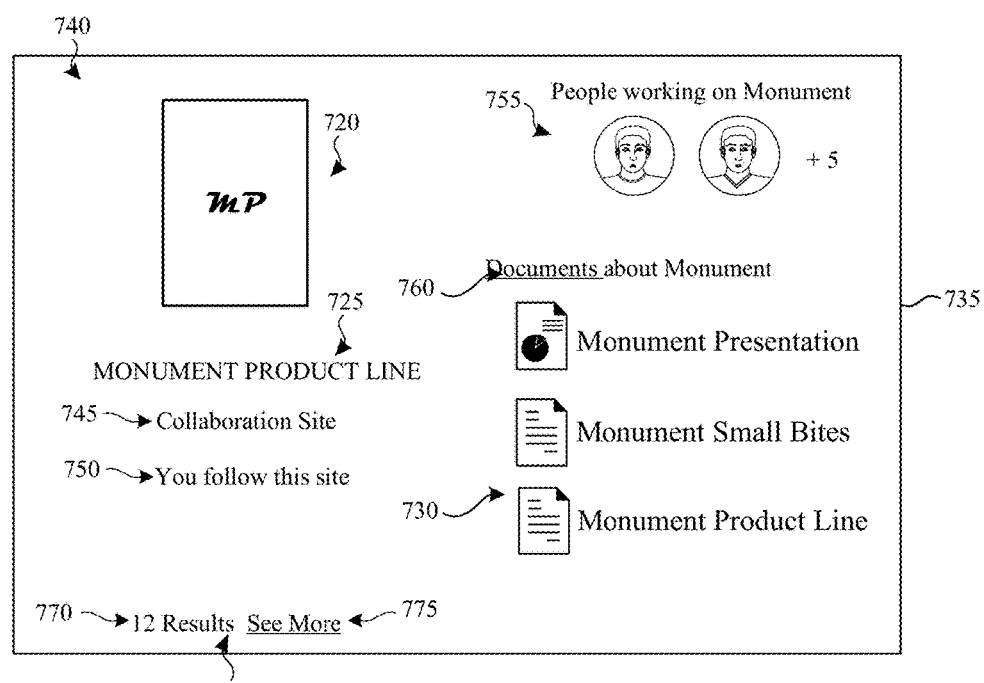

FIGS. 7A-7B depict example clustered results panels that can be produced by the method shown in FIG. 6. FIG. 7A illustrates one clustered results panel 700 that includes two clusters 705, 710. The first cluster 705 and the second cluster 710 each includes enterprise metadata 715 associated with an enterprise storage site. The enterprise metadata 715 may include any suitable type of metadata. In the illustrated embodiment, the enterprise metadata 715 includes a graphic image 720 associated with the enterprise storage site and a name 725 of the enterprise storage site.

The first and the second clusters 705, 710 further include a set of results 730 that are stored in the enterprise storage site. In the illustrated embodiment, each set of results 730 includes multiple results, which may include any suitable type of search result. Example types of results include, but are not limited to, documents, applications, communications, photos, videos, audio, links, web sites, other enterprise storage sites within the ESS (e.g., a lower level storage site), and the like.

FIG. 7B depicts a single clustered results panel 735 that includes one cluster 740. The cluster 740 includes enterprise metadata (same enterprise metadata 715 as shown in FIG. 7A and a storage site level identifier 745), interaction metadata 750, and organization metadata 755. The interaction metadata 750 includes information regarding interactions the search requestor may have with the enterprise storage site. Any suitable interaction information may be included (e.g., "You follow this site" and/or a list of the last X interactions). The organization metadata 755 may also include any suitable organization information, such as an organization chart or a list of the team members that work on a project stored in the storage site or access the enterprise storage site.

As described earlier, a clustered results panel may include one or more result metadata types and/or result metadatas. The clustered results panel 735 shown in FIG. 7B is based on three different result metadata types; "enterprise storage site", "project", and "document type." Thus, the set of results may be arranged into one or more categories. In the illustrated embodiment, the set of results 730 are listed under category 760, which lists the results associated with the result metadata type "project" (e.g., Monument) and the result metadata type "document type" (e.g., presentation and word processing document types). The representative clustered results panel 735 further includes additional information 765. The additional information 765 can be the number of results 770 that are found in the search and/or a link 775 to see more results (link indicated by underlining). In some embodiments, the word "files" in the category 760 can function as a link to additional files (link indicated by underlining).

Figure 8:
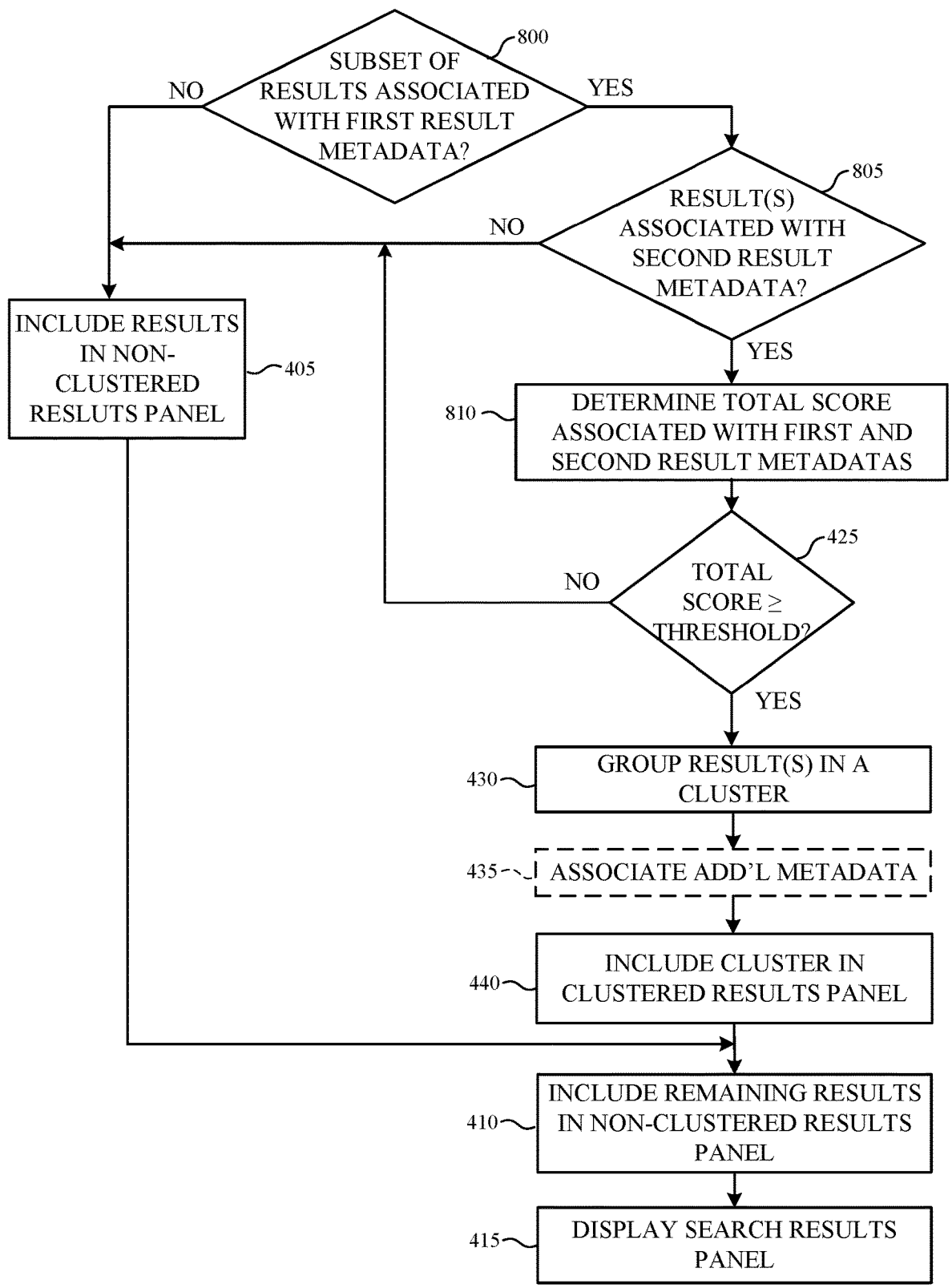
FIG. 8 is a flowchart depicting an example fourth method of performing a search operation that clusters search results according to metadata.

FIG. 8 is a flowchart depicting an example fourth method of performing a search operation that clusters search results according to metadata. In this example embodiment, the search results are clustered based on layering a first result metadata and a second result metadata. Many of the operations in FIG. 8 correspond to operations shown in FIG. 4. Accordingly, these operations include the same reference number used in FIG. 4 and are not discussed in detail in conjunction with FIG. 8.

Initially, as shown in block 800, a determination is made as to whether a subset the ranked of results is associated with a first result metadata. For example, the first result metadata can be an identifier for an enterprise storage site. If not, the process continues at block 405 where the ranked search results are provided in a non-clustered results panel in a search results panel and the operations of blocks 410 and 415 are performed.

When a subset of the ranked search results is associated with the first result metadata, the method passes to block 805 where a determination is made as to whether one or more results in the subset of the ranked search results is associated with a second result metadata. If not, the process continues at block 405 where the ranked search results are provided in a non-clustered results panel in a search results panel and the operations of blocks 410 and 415 are performed.

When one or more results in the subset of the ranked search results is associated with the second result metadata, the method passes to block 810 where a score associated with the first and the second result metadatas is determined. Any suitable technique may be used to determine the score. For example, in one embodiment, the score is a total score that is based on a first score associated with the first result metadata and a second score associated with the second result metadata (e.g., total score is sum of first and second scores). The first score and/or the second score can be determined using any aspect as described herein.

After the total score is determined at block 810, the process continues at block 425 where the total score is compared to a threshold value to determine if the total score equals or exceeds the threshold value. If not, the process passes to block 405 where the subset of the ranked search results is included in a non-clustered results panel and the operations of blocks 410 and 415 are performed. When the total score equals or exceeds the threshold value, the method passes to block 430 where the subset of the ranked search results is included in a cluster. Additional metadata can then be associated with the cluster and/or for one or more results in the cluster (block 435). Block 435 is optional (represented by dashed lines) and may be omitted in other embodiments.

Next, as shown in block 440, the cluster is provided or included in a clustered results panel. The process then continues at block 410, where the remaining results are included in the non-clustered results panel and the operation of block 415 is performed.

Although the threshold value in block 425 is described as a number that is compared to each total score to determine if the total score equals or exceeds the threshold value, other embodiments are not limited to this type of threshold value. As described earlier, in one embodiment the threshold value may be a range of total scores that each total score is compared with to determine if the total score is within the range. In another embodiment, the threshold value may be a particular delta or difference amount, and each total score is compared to the threshold value to determine if the total score differs from the total score of an immediately preceding or succeeding metadata by the threshold value.

As should be appreciated, FIGS. 3-8 are described for purposes of illustrating the present methods and systems and are not intended to limit the disclosure to a particular sequence of steps or a particular combination of graphical elements or software components. Additionally, the disclosed embodiments cluster results based on one type of metadata (e.g., persons or enterprise search site). Other embodiments are not limited to these operations. In some embodiments, results may be clustered based on multiple types of metadata.

Figure 9:
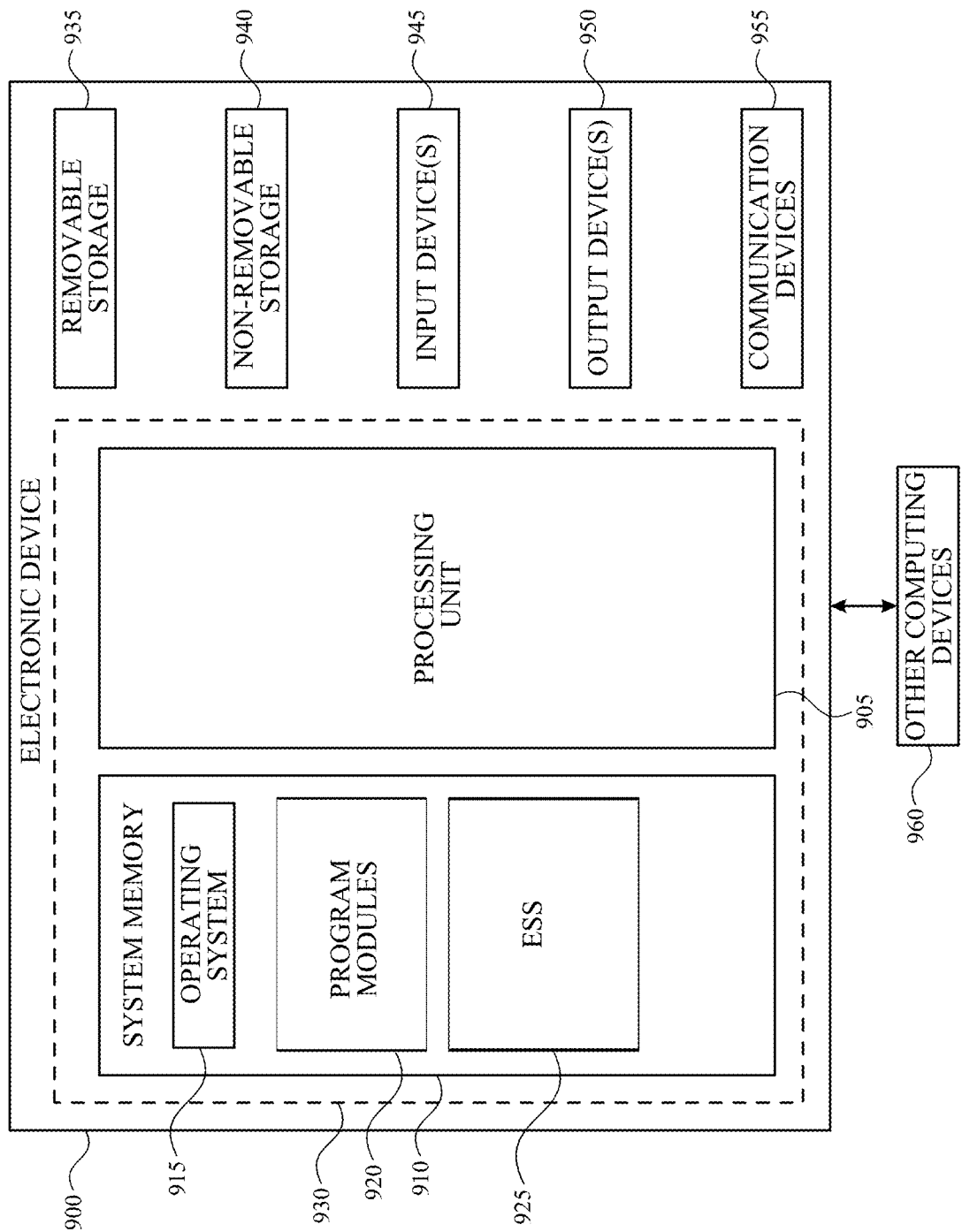
FIG. 9 is a block diagram illustrating example physical components of a computing device with which aspects of the disclosure may be practiced.

FIG. 9 is a block diagram illustrating physical components (e.g., hardware) of an electronic device 900 with which aspects of the disclosure may be practiced. The components described below may be suitable for the computing devices described above, including the client-computing device 110 and/or the server-computing device 125 in FIG. 1.

In a basic configuration, the electronic device 900 may include at least one processing unit 905 and a system memory 910. Depending on the configuration and type of the electronic device, the system memory 910 may comprise, but is not limited to, volatile storage (e.g., random access memory), non-volatile storage (e.g., read-only memory), flash memory, or any combination of such memories. The system memory 910 may include a number of program modules and data files, such as an operating system 915, one or more program modules 920 suitable for parsing received input, determining subject matter of received input, determining actions associated with the input and so on, and an ESS program module 925. While executing on the processing unit(s) 905, the ESS program module 925 may perform and/or cause to be performed processes including, but not limited to, the aspects as described herein.

The operating system 915, for example, may be suitable for controlling the operation of the electronic device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 930.

The electronic device 900 may have additional features or functionality. For example, the electronic device 900 may also include additional data storage devices (removable and/or non-removable) such as, for example, magnetic disks, optical disks, or tape. Such additional storage is illustrated in FIG. 9 by a removable storage device 935 and a non-removable storage device 940.

The electronic device 900 may also have one or more input device(s) 945 such as a keyboard, a trackpad, a mouse, a pen, a sound or voice input device, a touch, force and/or swipe input device, etc. The output device(s) 950 such as a display, speakers, a printer, etc. may also be included. The aforementioned devices are examples and others may be used. The electronic device 900 may include one or more communication devices 955 allowing communications with other electronic or computing devices 960. Examples of suitable communication devices 955 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 910, the removable storage device 935, and the non-removable storage device 940 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 900. Any such computer storage media may be part of the electronic device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor (e.g., processing unit), or on a single chip containing electronic elements or microprocessors (e.g., processing units). For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Figure 10A:
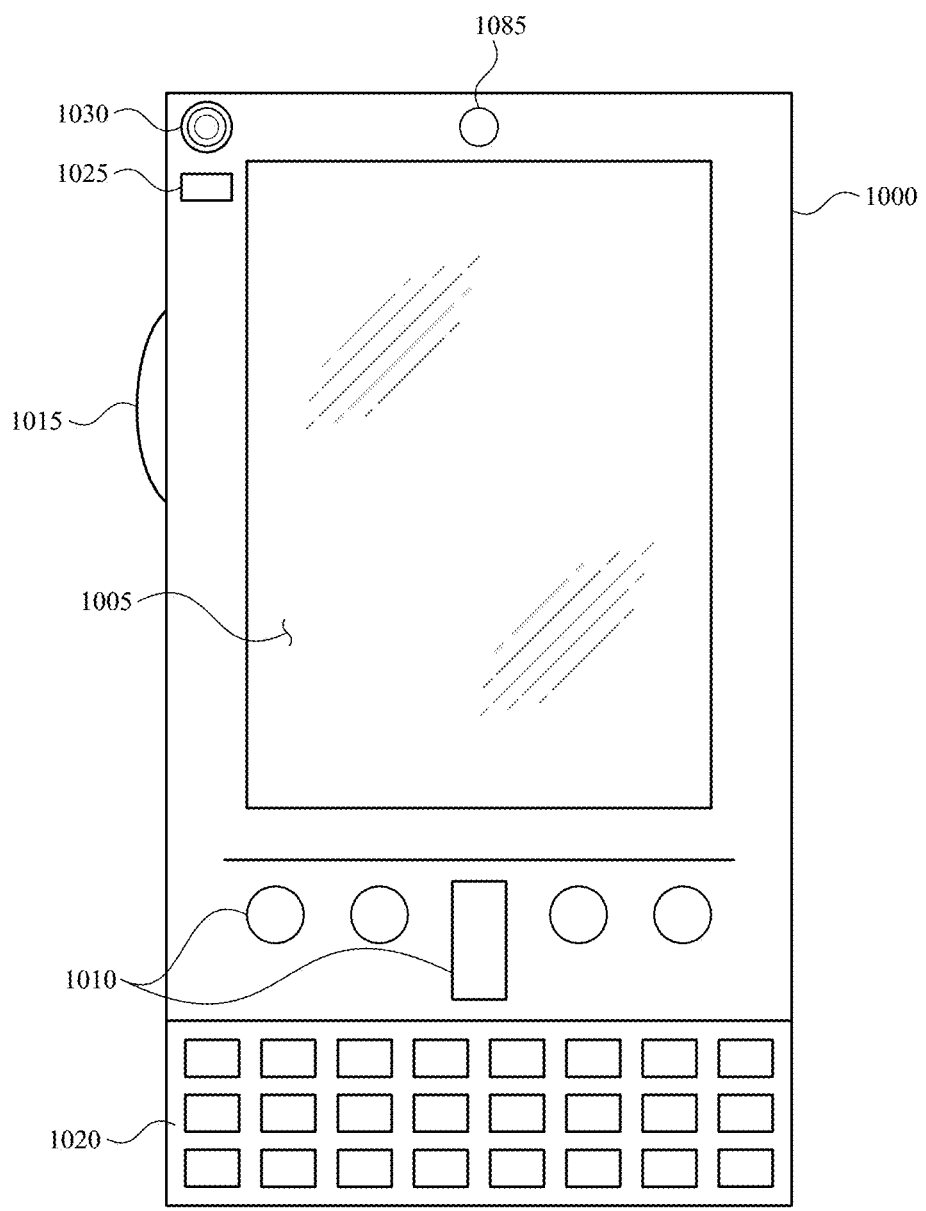
FIGS. 10A-10B are block diagrams depicting an example mobile computing device with which aspects of the present disclosure may be practiced.
Figure 10B:
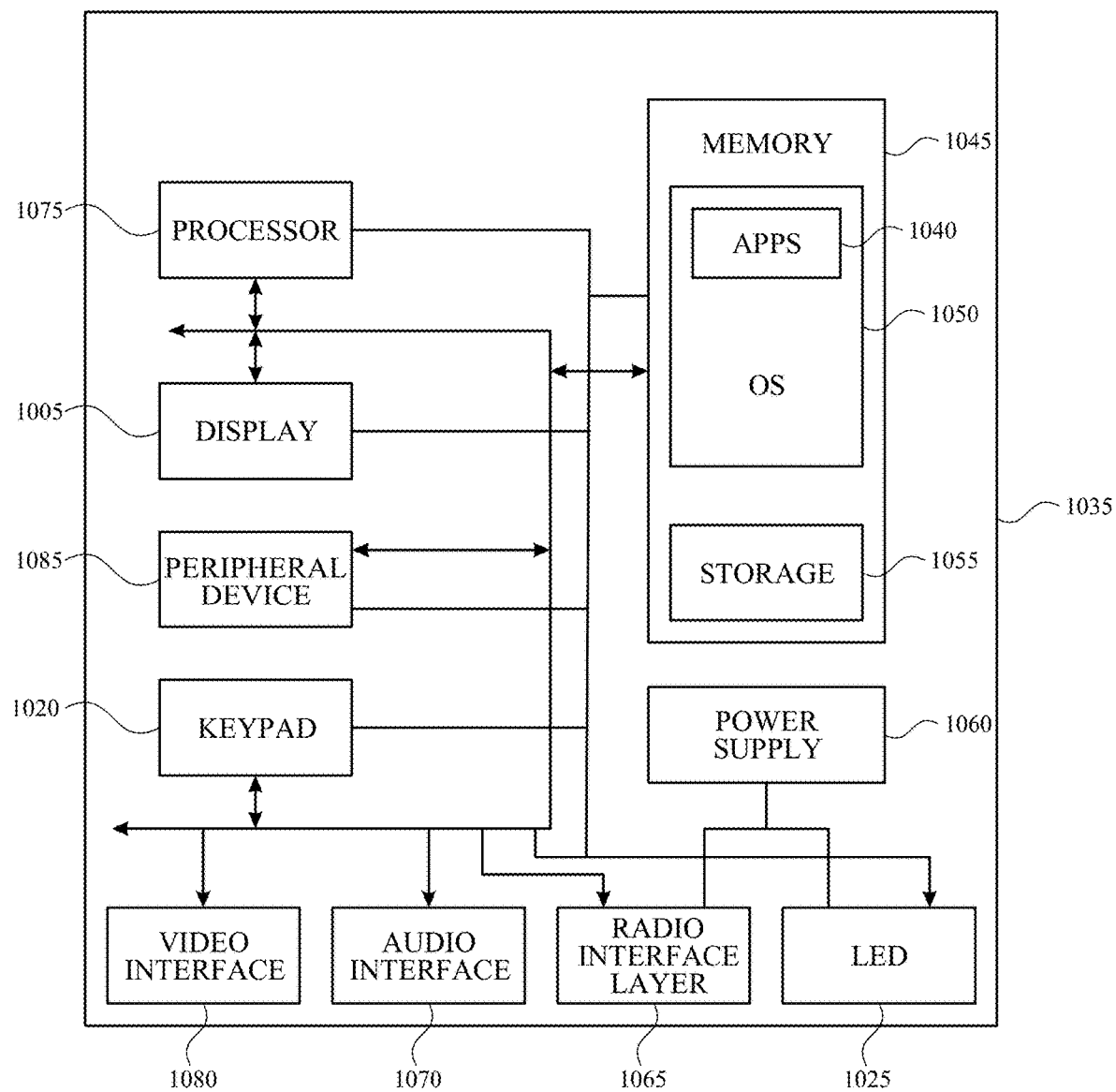

FIGS. 10A and 10B illustrate a mobile electronic device 1000, for example, a mobile telephone, a smart phone, wearable computer (such as a smart watch), a tablet computer, a laptop computer, and the like, with which embodiments of the disclosure may be practiced. With reference to FIG. 10A, one aspect of a mobile electronic device 1000 for implementing the aspects is illustrated.

In a basic configuration, the mobile electronic device 1000 is a handheld computer having both input elements and output elements. The mobile electronic device 1000 typically includes a display 1005 and one or more input buttons 1010 that allow the user to enter information into the mobile electronic device 1000. The display 1005 of the mobile electronic device 1000 may also function as an input device (e.g., a display that accepts touch and/or force input).

If included, an optional side input element 1015 allows further user input. The side input element 1015 may be a rotary switch, a button, or any other type of manual input element. In alternative aspects, mobile electronic device 1000 may incorporate more or less input elements. For example, the display 1005 may not be a touch screen in some embodiments. In yet another alternative embodiment, the mobile electronic device 1000 is a portable phone system, such as a cellular phone. The mobile electronic device 1000 may also include an optional keypad 1020. Optional keypad 1020 may be a physical keypad or a "soft" keypad generated on the touch screen display.

In various embodiments, the output elements include the display 1005 for showing a graphical user interface (GUI), a visual indicator 1025 (e.g., a light emitting diode), and/or an audio transducer 1030 (e.g., a speaker). In some aspects, the mobile electronic device 1000 incorporates a vibration transducer for providing the user with tactile feedback. In yet another aspect, the mobile electronic device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile electronic device 1000. That is, the mobile electronic device 1000 can incorporate a system (e.g., an architecture) 1035 to implement some aspects. In one embodiment, the system 1035 is implemented as a "smart phone" capable of running one or more applications (e.g., browser, e-mail, calendaring, contact managers, messaging clients, games, media clients/players, content selection and sharing applications and so on). In some aspects, the system 1035 is integrated as an electronic device, such as an integrated personal digital assistant (PDA) and wireless phone.

One or more application programs (APPS) 1040 may be loaded into the memory 1045 and run on or in association with the operating system (OS) 1050. Examples of the application programs include phone dialer programs, e-mail programs, personal information management (PIM) programs, word processing programs, spreadsheet programs, Internet browser programs, messaging programs, and so forth.

The system 1035 also includes a non-volatile storage area 1055 within the memory 1045. The non-volatile storage area 1055 may be used to store persistent information that should not be lost if the system 1035 is powered down.

The application programs 1040 may use and store information in the non-volatile storage area 1055, such as email or other messages used by an email application, and the like. A synchronization application (not shown) also resides on the system 1035 and is programmed to interact with a corresponding synchronization application resident on a host computer to keep the information stored in the non-volatile storage area 1055 synchronized with corresponding information stored at the host computer.

The system 1035 has a power supply 1060, which may be implemented as one or more batteries. The power supply 1060 may further include an external power source, such as an AC adapter or a powered docking cradle that supplements or recharges the batteries.

The system 1035 may also include a radio interface layer 1065 that performs the function of transmitting and receiving radio frequency communications. The radio interface layer 1065 facilitates wireless connectivity between the system 1035 and the "outside world," via a communications carrier or service provider. Transmissions to and from the radio interface layer 1065 are conducted under control of the operating system 1050. In other words, communications received by the radio interface layer 1065 may be disseminated to the application programs 1040 via the operating system 1050, and vice versa.

The visual indicator 1025 may be used to provide visual notifications, and/or an audio interface 1070 may be used for producing audible notifications via an audio transducer (e.g., audio transducer 1030 illustrated in FIG. 10A). In the illustrated embodiment, the visual indicator 1025 is a light emitting diode (LED) and the audio transducer 1030 may be a speaker. These devices may be directly coupled to the power supply 1060 so that when activated, they remain on for a duration dictated by the notification mechanism even though the processor 1075 and other components might shut down for conserving battery power. The LED may be programmed to remain on indefinitely until the user takes action to indicate the powered-on status of the device.

The audio interface 1070 is used to provide audible signals to and receive audible signals from the user (e.g., voice input such as described above). For example, in addition to being coupled to the audio transducer 1030, the audio interface 1070 may also be coupled to a microphone to receive audible input, such as to facilitate a telephone conversation. In accordance with embodiments of the present disclosure, the microphone may also serve as an audio sensor to facilitate control of notifications, as will be described below.

The system 1035 may further include a video interface 1080 that enables an operation of peripheral device 1085 (e.g., on-board camera) to record still images, video stream, and the like. The captured images may be provided to the artificial intelligence entity advertisement system such as described above.

A mobile electronic device 1000 implementing the system 1035 may have additional features or functionality. For example, the mobile electronic device 1000 may also include additional data storage devices (removable and/or non-removable) such as, magnetic disks, optical disks, or tape. Such additional storage is illustrated in FIG. 10B by the non-volatile storage area 1055.

Data/information generated or captured by the mobile electronic device 1000 and stored via the system 1035 may be stored locally on the mobile electronic device 1000, as described above, or the data may be stored on any number of storage media that may be accessed by the device via the radio interface layer 1065 or via a wired connection between the mobile electronic device 1000 and a separate electronic device associated with the mobile electronic device 1000, for example, a server-computing device in a distributed computing network, such as the Internet. As should be appreciated such data/information may be accessed via the mobile electronic device 1000 via the radio interface layer 1065 or via a distributed computing network. Similarly, such data/information may be readily transferred between electronic devices for storage and use according to well-known data/information transfer and storage means, including electronic mail and collaborative data/information sharing systems.

As should be appreciated, FIG. 10A and FIG. 10B are described for purposes of illustrating the present methods and systems and is not intended to limit the disclosure to a particular sequence of steps or a particular combination of hardware or software components.

Figure 11:
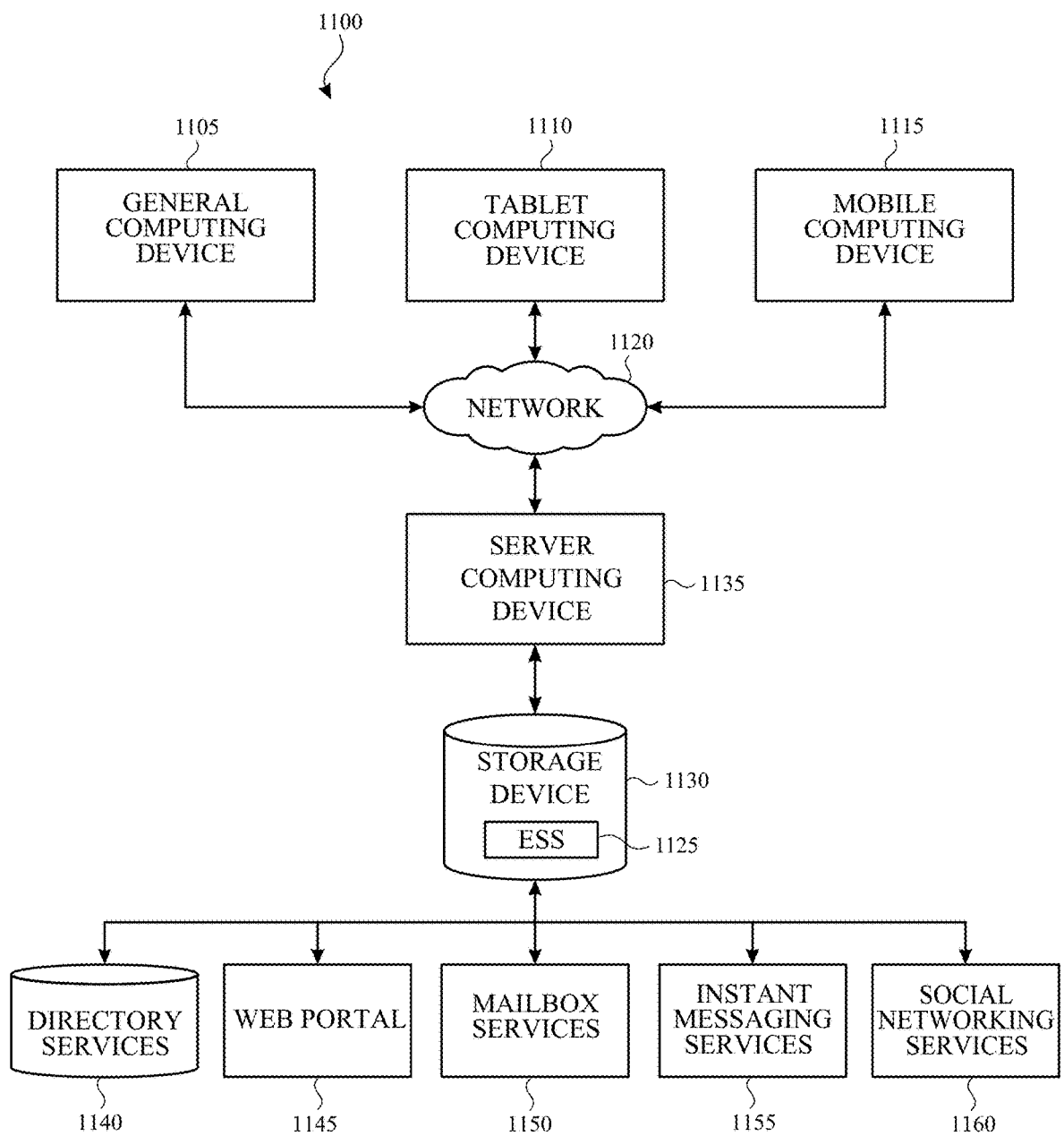
FIG. 11 is a block diagram illustrating a distributed computing system in which aspects of the present disclosure may be practiced.

FIG. 11 is a block diagram illustrating a distributed system in which aspects of the disclosure may be practiced. The system 1100 allows a search requestor to submit a search request (e.g., verbally and/or written) through a general computing device 1105 (e.g., a desktop computer), a tablet computing device 1110, and/or a mobile computing device 1115. The general computing device 1105, the tablet computing device 1110, and the mobile computing device 1115 can each include the components, or be connected to the components, that are shown associated with the client-computing device 110 in FIG. 1 and/or the mobile electronic device 1115 in FIG. 11.

The general computing device 1105, the tablet computing device 1110, and the mobile computing device 1115 are each configured to access one or more networks (represented by network 1120) to interact with the ESS 1125 stored in one or more storage devices (represented by storage device 1130) and executed on one or more server-computing devices (represented by server-computing device 1135). The network 1120 is illustrative of an enterprise-based network, for example, an intranet, and/or a distributed computing network, for example, the Internet, over which the general computing device 1105, the tablet computing device 1110, and the mobile computing device 1115 may communicate with other users and with other computing systems in an enterprise.

In some aspects, the server-computing device 1135 can access and/or receive various types of documents and information transmitted from other sources, such as a directory service 1140, a web portal 1145, mailbox services 1150, instant messaging services 1155, and/or social networking services 1160. In some instances, these sources may provide robust reporting, analytics, data compilation and/or storage service, etc., whereas other services may provide search engines or other access to data and information, images, videos, document processing and the like.

As should be appreciated, FIG. 11 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. An enterprise search system, comprising:
   a processing unit; and
   a storage device storing computer executable instructions that when executed by the processing unit, perform a method, the method comprising:
   identifying a result metadata type that is associated with a subset of ranked search results;
   identifying a result metadata that is associated with one or more results in the subset of ranked search results, the result metadata corresponding to the result metadata type;
   determining a score associated with the result metadata;
   comparing the score to a threshold value;
   based on the comparison, grouping the one or more results in the subset of ranked search results in a cluster and including the cluster in a clustered results panel of a search panel; and
   including ranked search results not included in the subset in a non-clustered results panel of the search panel.

2. The enterprise search system of claim 1, further comprising a communications device connected to the processing unit, wherein the storage device further stores computer executable instructions that when executed by the processing unit, causes one or more results in at least one of the non-clustered results panel or the clustered results panel to be transmitted to a client-computing device.

3. The enterprise search system of claim 1, wherein the operation of determining the score associated with the result metadata comprises determining a total score associated with the result metadata by:
   determining a score for each result in the subset of ranked search results; and
   aggregating the scores to produce the total score.

4. The enterprise search system of claim 3, wherein the operation of determining the score for each result in the subset of ranked search results comprises multiplying a rank value of each result that is based on a position of the result in the ranked search results by a respective weighting factor.

5. The enterprise search system of claim 1, wherein the result metadata comprises an enterprise storage site and the operation of determining the score associated with the result metadata comprises determining a total score associated with the result metadata by:
   determining a score for each result in the subset of ranked search results;
   aggregating the scores to produce a sum; and
   multiplying the sum by a weighting factor associated with the enterprise storage site to produce the total score.

6. The enterprise search system of claim 1, wherein the result metadata comprises an enterprise storage site and the operation of determining the score associated with the result metadata comprises determining a total score associated with the result metadata based on the equation:

$$\text{Total score} = (\text{site weighting factor}) * \Sigma(\text{result rank} * \text{site rank}),$$

where the result rank is a first rank value based on a position of the result in the ranked search results, the site rank is a second rank value based on a position of the enterprise storage site in a hierarchy of enterprise storage sites, and the site weighting factor is a weighting factor associated with the enterprise storage site.

7. The enterprise search system of claim 1, wherein the method further comprises including additional metadata in the clustered results panel, the additional metadata comprising at least one of personalized metadata, a relationship metadata, an interaction metadata, or an organization metadata.

8. The enterprise search system of claim 1, wherein the operation of comparing the score to the threshold value comprises determining whether the score equals or exceeds the threshold value.

9. The enterprise search system of claim 1, wherein:
the operation of comparing the score to the threshold value comprises determining whether the score is equal to or greater than the threshold value; and
when the score equals or exceeds the threshold, the subset of ranked search results are grouped in the cluster and the cluster is included in the clustered results panel of a search panel, and when the score is less than the threshold value, the results in the subset of ranked search results are included in the non-clustered results panel of the search results panel.

10. A method of operating an enterprise search system, comprising:
identifying a result metadata that is associated with a subset of ranked search results;
determining a score associated with the result metadata;
comparing the score to a threshold value;
grouping results in the subset of ranked search results into a cluster and including the cluster in a clustered results panel of a search results panel when the score is a first value;
including the results in the subset of ranked search results in a non-clustered results panel of the search results panel when the score is a second value; and
including remaining ranked search results not included in the subset in the non-clustered results panel of the search panel.

11. The method of claim 10, wherein the operation of comparing the score to the threshold value comprises determining whether the score is within a range of scores, and wherein the first value is within the range of scores and the second value is not within the range of scores.

12. The method of claim 10, wherein the operation of comparing the score to the threshold value comprises determining whether a difference between the score and a score of another result metadata that corresponds to the metadata type is equal to or less than a given amount, and wherein the first value has the difference that is equal to or less than the given amount and the second value has the difference that is greater than the given amount.

13. The method of claim 10, wherein the operation of comparing the score to the threshold value comprises determining whether the score is equal to or greater than the threshold value, and wherein the first value is equal to or greater than the threshold value and the second value is less than the threshold value.

14. The method of claim 10, wherein the operation of determining the score associated with the result metadata comprises determining a total score associated with the result metadata by:
determining a score for each result in the subset of ranked search results; and
aggregating the scores to produce the total score.

15. The method of claim 14, wherein the operation of determining the score for each result in the subset of ranked search results comprises multiplying a rank value of each result that is based on a position of the result in the ranked search results by a respective weighting factor.

16. A method, comprising:
identifying a result metadata type that is associated with a subset of ranked search results, the result metadata type comprising a hierarchy of enterprise storage sites;
determining a score associated with a result metadata corresponding to the hierarchy of enterprise storage sites, the result metadata comprising a particular enterprise storage site in the hierarchy of enterprise storage sites;
comparing the score to a threshold value;
grouping results in the subset of ranked search results that are associated with the particular enterprise storage site into a cluster and including the cluster in a clustered results panel of a search results panel when the score is a first value;
including the results in the subset of ranked search results that are associated with the particular enterprise storage site in a non-clustered results panel of the search results panel when the score is a second value; and
providing remaining ranked search results not included in the subset of ranked search results in the non-clustered results panel of the search panel.

17. The method of claim 16, wherein the subset of the ranked search results comprises a top N results in the ranked search results, where N is a number greater than one.

18. The method of claim 16, wherein the operation of determining the score associated with the result metadata comprises determining a total score associated with the particular enterprise storage site by:
determining a score for each result in the subset of ranked search results that is associated with the particular enterprise storage site;
aggregating the scores to produce a sum; and
multiplying the sum by a weighting factor associated with the particular enterprise storage site to produce the total score.

19. The method of claim 16, wherein the operation of determining the score associated with the result metadata comprises determining a total score associated with the particular enterprise storage site based on the equation:

Total score=(site weighting factor)=Σ(result rank*site rank), where the result rank is a first rank value based on a position of a result in the ranked search results that is associated with the particular enterprise storage site, the site rank is a second rank value based on a position of the particular enterprise storage site in the hierarchy of enterprise storage sites, and the site weighting factor is a weighting factor associated with the particular enterprise storage site.

20. The method of claim 16, wherein the operation of comparing the score to the threshold value comprises determining whether the score is equal to or greater than the threshold value, and wherein the first value is equal to or greater than the threshold value and the second value is less than the threshold value.

21. A method, comprising:
identifying a first result metadata that is associated with a subset of ranked search results;
identifying a second result metadata that is associated with one or more results in the subset of ranked search results;

determining a score associated the first and the second result metadatas;

comparing the score to a threshold value;

grouping the one or more results in the subset of ranked search results into a cluster and including the cluster in a clustered results panel of a search results panel when the score is a first value; and including the one or more results in the subset of ranked search results in a non-clustered results panel of the search results panel when the score is a second value.

* * * * *